3,284,558
INJECTION MOLDING COMPOSITE BOTTOMS
Herbert P. Ludwig, Desmastr. 112, Uesen,
near Bremen, Germany
Filed Oct. 6, 1964, Ser. No. 401,886
11 Claims. (Cl. 264—244)

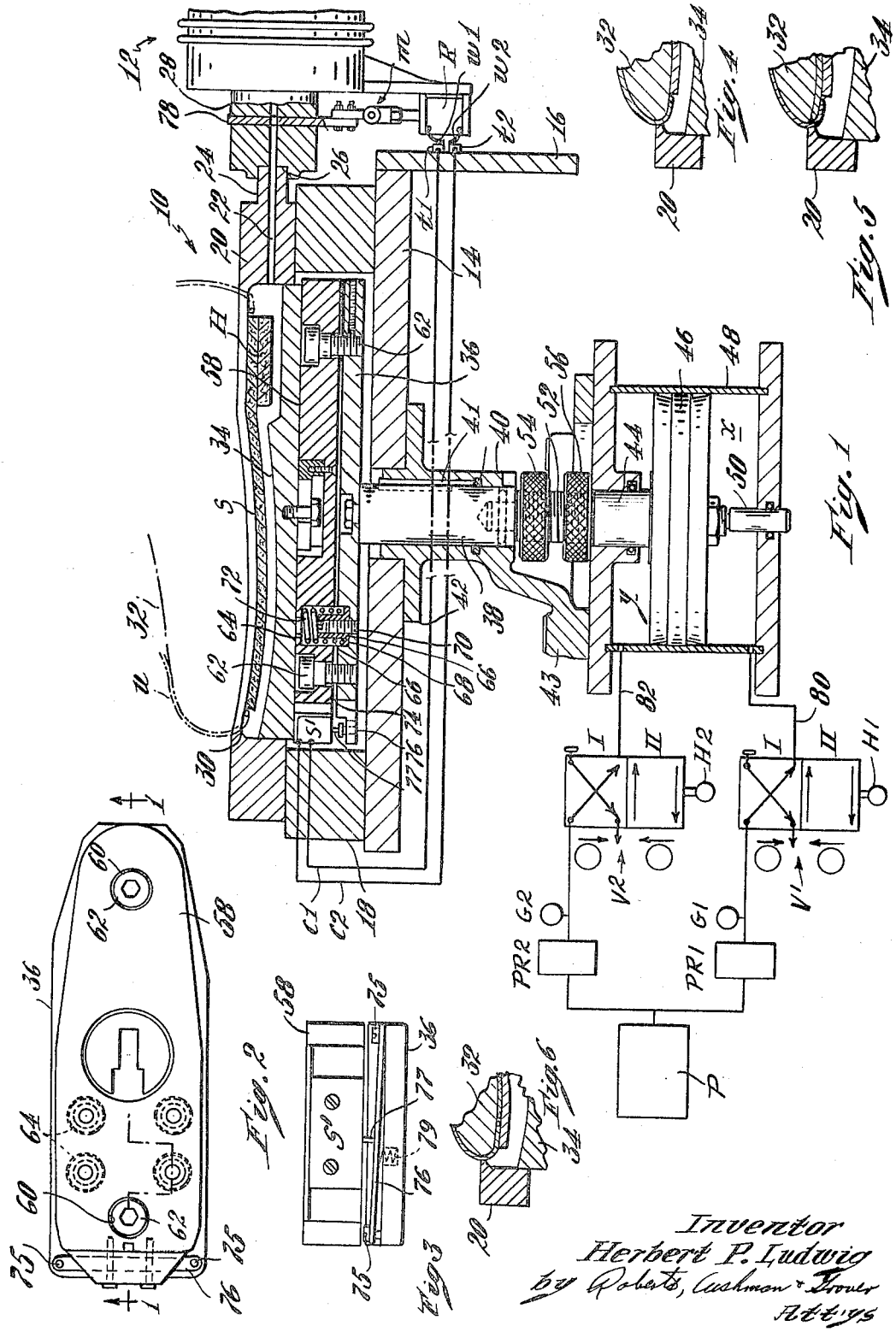

This invention relates to a method for making shoes and, in particular, to shoes in which the bottom is formed of one or more preformed intermediate elements attached to the bottom of the upper and an injection molded outsole applied to the bottom about the intermediate elements.

The principal objects of the invention are to provide a method whereby an intermediate bottom element, such as an insole blank and/or heel core of suitable material, for example leather, cork, felt, or the like, may be attached to the bottom of an upper contemporaneously with the forming of the outsole by injection molding, for such purposes as increasing comfort, reducing weight and economizing in the use of bottom-forming composition; to provide a method which enables securely attaching one or more intermediate elements to the bottom of a lasted upper prior to injection of the bottom-forming composition so that injection cannot displace the intermediate element or elements; to provide a method wherein different pressures are available for attaching the intermediate elements, for injecting the bottom-forming composition without requiring excessive pressure of the upper against the open top of the mold and for applying an attaching pressure following injection to insure adhesion to the upper and compaction of the outsole; and to provide a method which makes it possible to attach a preformed bottom element and a moldable bottom material successively to the bottom of the lasted upper with injection molding apparatus substantially automatically. Other objects are to provide a method of making shoes embodying a preformed intermediate bottom structure and a moldable outsole.

As herein illustrated, the apparatus comprises a mold having an open top and bottom, a sole plate supported at the bottom of the mold for movement toward and from the bottom of a last-supported upper resting on the top of the mold, and means for moving the sole plate to a first position to attach a preformed bottom element to the bottom of the lasted upper by pressing the bottom element into engagement with the bottom, and a second position retracted from the bottom to provide a closed mold cavity beneath the bottom of the upper and the bottom element attached thereto to receive a charge of bottom-forming composition to fill the mold and to envelop the bottom element. The sole plate rests on a lift plate and the lift plate is connected to one end of a piston rod. A piston is connected to the other end of the piston rod and there are valves operable to deliver pressure to the lower side of the piston to raise the sole plate into attaching position to attach a preformed bottom element and then retract the sole plate to provide the mold cavity preferably while retaining the initial pressure at the underside of the piston as for example, by applying a higher pressure to the upper side of the piston. The sole plate is yieldably supported relative to the lift plate in an inclined position, there is means for injecting bottom-forming composition into the mold cavity, and there is means operative, by depression of the sole plate into parallelism with the lift plate by filling of the mold cavity, to terminate operation of the injection means and exhaust the pressure at the upper side of the piston to permit the pressure at the lower side to apply an after-pressure to the sole plate while the bottom-forming composition is setting. Preferably a rocker plate is interposed between the sole plate and the lift plate with springs interposed between one end of the rocker plate and the lift plate, and a switch is mounted on the rocker plate above the lift plate operable, by depression of the rocker plate, to actuate a solenoid in such fashion as to close a valve situated in the nozzle of the injector and to shift the valve which connects the upper side of the piston to the pressure source to an exhaust position. The mold is comprised of halves which may be moved into and out of engagement and preferably the mold halves are moved apart when the sole plate is elevated and then moved together about the sole plate when the latter is retracted for injection.

In accordance with the method a last-supported upper is placed on an open top mold, a preformed bottom element precemented for flat lasting is raised into engagement with the bottom side of the upper to attach it thereto by pressure, and then a bottom-forming composition is applied to the bottom to envelop the intermediate bottom element and attach itself thereto and to the margin of the upper around the bottom element. Conveniently, the method is carried out with a mold having an open top and bottom and a sole plate situated at the bottom movable toward the bottom of the last resting on the top of the mold to attach a preformed bottom element by pressing it into engagement with the bottom of the lasted upper and thereafter away from the bottom to provide a closed mold cavity into which bottom-forming composition may be injected, and of then injecting bottom-forming composition into the closed mold to completely fill it and envelop the bottom. An after-pressure is applied during coalescence to issue adhesion of the bottom-forming composition to the upper and to insure compaction of the bottom-forming composition.

The invention will now be described in greater detail with reference to the accompanying drawing wherein:

FIG. 1 is an elevation, taken longitudinally on the line 1—1 shown in FIG. 2, of one unit of a machine which may embody a plurality of such units with its parts shown in vertical section and located in a position to receive an injection of bottom-forming composition from an injection apparatus, only a fragmentary portion of which is shown;

FIG. 2 is a plan view omitting the mold parts and support to show the rocker plate;

FIG. 3 is an end elevation taken at the left end of FIG. 2;

FIG. 4 is a fragmentary vertical section at the toe of an upper showing the relation of the filler to a string-lasted upper;

FIG. 5 is a fragmentary vertical section at the toe of an upper showing the relation of the filler to a flat lasted upper and;

FIG. 6 is a fragmentary vertical section of an upper showing the relation of the filler to a sock-lasted upper.

Referring to the drawings (FIG. 1) a single bottom attaching unit 10, of which there may be several mounted on a turntable support for rotation about a vertical axis, is shown in a position for receiving an injection of bottom-forming composition from an injection device 12 located at one side of the table. If desired, there may be several such injection devices located concentrically about the axis of rotation of the table to permit positioning the units opposite different injection devices to enable applying bottoms of different composition and/or color when desired.

Each unit 10 is supported on a rigid platform 14 secured to and forming part of the structure 16 of the turntable, the latter not being shown since it is of conventional design. A block 18 containing a central opening is mounted on each platform 14 and provides support on its upper surface for a bottom-forming mold comprised of two halves 20 adapted to be moved into engagement to provide a mold cavity corresponding in shape to the bottom of a shoe and to be moved into and out of engagement by sliding toward and from each other on the block 18 by suitable toggle means, as shown for example in the Hardy patent, No. 2,878,523, dated March 24, 1959. The meeting faces of the mold halves at the heel end of the mold, as shown in FIG. 1, contain semicircular grooves 22 which collectively define, when the mold halves are brought into engagement, an injection passage through which bottom-forming composition may be injected into the mold cavity. Reduced portions 24 are formed at the heel ends of the mold halves for interengagement with a recess 26 in the nozzle 28 of the injection device 12. Interengagement of the portion 24 with the recess 26 may be effected either by moving the injection device toward the molding unit or the molding unit toward the injection device.

The mold is open at the top and has peripherally thereof a lip 30 for supporting a last 32 on which has been lasted an upper U of suitable material, such as leather, a woven fabric or a synthetic sheet material. Preferably a metal last is employed and the upper may be secured thereto by string-lasting, as shown in FIG. 4, or by other conventional lasting methods, for example flat lasting as shown in FIG. 5 wherein the upper is lasted to an insole, and sock lasting as shown in FIG. 6 in which the upper is connected in abutting relation to a sock lining. The bottom of the mold is open and a sole plate 34 is fitted into the bottom opening and supported therein for movement toward and away from the bottom of the lasted upper by a lift plate 36 situated in the opening in the block 18. The lift plate is attached to the upper end of a piston rod 38, the latter being mounted for vertical movement in a sleeve 40 secured to the underside of the platform 14 by a flange 42. The piston rod is prevented from rotating in the sleeve by a spline 41 and its lower end is connected by a part 44 to a piston 46 located in a cylinder 48. The upper head of the cylinder is secured to a bracket 43 at the lower end of the sleeve 40. The lower side of the piston has a tail rod 50 on it slidable through an opening in the lower cylinder head. The piston provides means for raising and lowering the sole plate 34 in the mold cavity.

The extent of vertical movement of the piston rod is controlled by two adjustable nuts 54 and 56 mounted on a threaded portion 52 of the part 44 and operable, by engagement, respectively, with the upper head of the cylinder and the lower end of the sleeve 40, to limit downward movement and upward movement of the piston rod. Adjustment of the nut 56 enables varying the thickness of the outsole.

The sole plate 34 is yieldably supported on the lift plate 36 by a rocker plate 58, the purpose of which is to enable automatically cutting off injection when the mold cavity is filled. The rocker plate contains near its opposite ends holes 60 which are countersunk for receiving screw bolts 62, the lower ends of which are screwed into the lift plate 36 and loosely attach the rocker plate to the lift plate. The left end of the rocker plate contains in its underside four cylindrical recesses 64 (FIG. 2) and the lift plate 36 contains in corresponding positions recesses 66. Sleeves 68 having flanges at their lower ends are secured in the recesses 66 by screw bolts 70 and provide adjustable supports for the lower ends of coiled springs 72 disposed with their ends in the recesses 64 and 66. The springs yieldably support the rocker plate so that it inclines from left to right, as shown in FIG. 1, at an angle 74 to the lift plate. A switch S1 is secured to the left-hand end of the rocker plate 58 (FIG. 3) having a downwardly projecting actuating pin 77. A bar 76 is mounted on the lift plate below the switch with its ends loosely fastened to the lift plate by bolts 75 and with a spring 79 situated between it and the lift plate. The spring is disposed at one side of the center of length of the bar so that the latter is inclined at an angle to the lift plate and by adjusting one of the bolts the bar can be adjusted relative to the switch-actuating pin 77 thus enabling adjustment of the actuating position of the switch S1.

The switch is connected by conductors C1, C2, a pair of terminal blocks t1, t2 and a pair of brushes w1, w2 to a solenoid R. The solenoid R is connected by linkage m to a gate valve 78 in the nozzle 28. Filling of the mold cavity sufficiently to depress the sole plate 34 and hence the rocker plate 58 into substantial parallelism with the lift plate 36, depending upon the adjusted position of the bar 76, actuates the switch S1 and this, in turn, actuates the solenoid so as to move the gate valve 78 in a direction to cut off discharge. The terminals and brushes permit the mold assembly and nozzle to be separated for rotation of the molding assembly relative to the injection unit.

The apparatus, as related above, is designed to make it possible to apply a filler and/or a heel core to the bottom of a lasted upper prior to the application of the outsole as a part of the bottom-attaching operation so as to eliminate the delay entailed by independent attachment of the filler and heel core and the bottom-forming operation. This is accomplished herein by providing a precut filler S (FIG. 1) and a precut heel core H of suitable material which may be yieldable for the purpose of comfort or merely bulky to serve as a filler and attaching these components to the bottom of the upper by placing them on the upper surface of the sole plate and then raising the latter into engagement with the bottom of the upper on the last and pressing them into engagement therewith sufficiently to cause them to become attached to the upper. Various means may be employed for obtaining attachment by application of pressure, the most convenient being by the use of an adhesive applied to the surfaces of the components which are to be attached to the bottom of the upper or to the lasting margin of the upper and to an insole or sock if the latter is employed. Preferably a pressure-sensitive adhesive is employed which will not adhere to other parts except by the application of pressure. Following attachment of the filler and/or heel core by raising the lift plate 36 into a pressing position, the sole plate is lowered to the position shown in FIG. 1, so as the provide a closed cavity below the bottom of the shoe and the attached filler and/or heel core of such depth as to provide an outsole of suitable thickness. With the sole plate retracted, the bottom-forming composition is now injected through the passage 22 into the cavity so as to completely fill the mold cavity about the attached filler and heel core. Injection is continued until the pressure within the mold cavity displaces the forward end of the sole plate downwardly sufficiently to press the forward end of the rocker plate 58 and thereby to actuate the switch S1. This terminates injection as related above. In practice it is preferred that during the attachment of the filler and heel core, the mold halves 20 be separated from each other so that the movement of the sole plate 36 upwardly does not cause excessive wear. After attachment of these components, the sole plate is lowered and the mold haves 20 are brought together to provide, in conjunction with the sole plate, a closed cavity within which the bottom-forming composition may be injected beneath the bottom of the shoe.

Raising and lowering of the sole plate as related above is provided for by the piston 46, the latter being movable in the cylinder 48 and dividing the latter into lower and upper chambers $x$ and $y$. Pressure fluid is supplied to the chambers $x$ and $y$ by way of valves V1 and V2 and conductors 80 and 82 from a common source of pressure P. Pressure reducers PR1 and PR2 and gauges G1 and G2 are interposed between the pressure source to each of the valves V1 and V2. Each of the valves has a position I and a position II. Referring to FIG. 1, when the valve V1 is in the position I, pressure fluid is permitted to flow from the source P through the line 80 to the chamber $x$ so as to raise the piston and hence the sole plate. By means of the pressure-regulator a pressure of approximately 3 atmospheres is employed to lift the sole plate to a position to press a filler and/or heel core into engagement with the bottom of the upper. At this ime the valve V2 is in position II, so that no fluid pressure is present in the chamber $y$. To retract the sole plate for injection, the valve V1 is left in the position related above and the valve V2 is moved to position I which admits pressure from the source P through the conductor 82 to the chamber $y$. The pressure regulator PR2 is adjusted to supply pressure of approximately 6 atmospheres to the cylinder $y$ and since there is a differential of 3 atmospheres, the piston will move downwardly and retract the sole plate 34. Handles H1 and H2 are provided for shifting the respective valves V1 and V2. However, for fully automatic operation the valves may be shifted automatically by means of solenoids. Preferably the valve V2 is electrically shifted following operation of the switch S1 which cuts off the injection and exhausts the fluid pressure from the chamber $y$ thereby permitting the piston to be moved upwardly by the still existing pressure in the chamber $x$ to apply afterpressure during the setting of the bottom-forming composition to insure its compaction and attachment to the bottom of the upper.

The piston is lowered to the bottom of the cylinder by moving the valve V1 to position II to vent the chamber $x$ through the line 80. This may be done manually by movement of the handle H1 or automatically by a timer so that following termination of a time sufficient to insure setting a solenoid will be operated to shift the valve V1 to the II position.

The above arrangement of the valve enables, in conjunction with the injection apparatus, partial or complete automatic control of the machine.

It should be understood that the present disclosure is for the purpose of illustration only and that this invention includes all modifications and equivalents which fall within the scope of the appended claims.

I claim:

1. The method of applying bottoms to shoes comprising supporting a last with an upper lasted thereon in engagement with the top of an open top mold, supporting a sole plate at the bottom of the mold for movement toward the bottom of the upper on the last, attaching a filler to the bottom of the lasted upper by moving the sole plate toward the bottom of the last to press the filler against the bottom of the lasted upper, moving the sole plate away from the bottom of the lasted upper to provide a closed cavity between it and the attached filler for receiving a bottom-forming composition, and injecting a bottom-forming composition into the cavity to form an outsole about the filler.

2. The method of applying bottoms to shoes comprising providing a mold with an open top and bottom, supporting a last with an upper lasted thereon in engagement with the open top, supporting a sole plate at the bottom for movement through the open bottom toward the bottom of the lasted upper, attaching a bottom element to the bottom of the lasted upper by moving the sole plate toward the bottom of the last sufficiently to press the bottom element into engagement with the bottom of the upper, retracting the sole plate to provide a closed cavity between it and the bottom of the lasted upper including the attached bottom element, and then injecting a bottom-forming composition into the cavity about the bottom element into adhesive contact with the latter and the margin of the upper peripherally of the bottom element to form an outsole.

3. The method of applying bottoms to shoes comprising providing a mold with an open top and bottom, supporting a last with an upper lasted thereon in engagement with the open top, supporting a sole plate for movement through the open bottom toward the bottom of the lasted upper, attaching one or more bottom elements to the forepart and heel end of the lasted upper by moving the sole plate toward the bottom of the upper sufficiently to press the bottom elements into engagement with the bottom of the lasted upper, retracting the sole plate, leaving the bottom elements attached to the bottom of the upper, sufficiently to provide a closed cavity between the bottom elements and the sole plate within which to form an outsole of suitable thickness, and injecting a bottom-forming composition into the cavity to envelop the bottom elements and become attached to the bottom of the upper marginally of the bottom elements.

4. The method of applying composite bottoms to shoes comprising providing a mold with an open top and bottom, supporting a last with an upper lasted thereon in engagement with the open top, supporting a sole plate for movement through the open bottom toward the lasted upper, attaching one or more preformed intermediate bottom elements to the bottom of the lasted upper by moving the sole plate with the bottom elements resting thereon ino engagement with the bottom of the lasted upper, retracting the sole plate, leaving the bottom elements attached to the bottom of the upper, sufficiently to provide a closed cavity between the bottom elements and the sole plate within which to form an outsole of suitable thickness, and injecting a plastic bottom-forming composition into the cavity to envelop the bottom elements and become attached to the bottom of the upper marginally of the bottom elements.

5. The method of applying composite bottoms to shoes comprising providing a mold with an open top and bottom, supporting a last with an upper lasted thereon in engagement with the top of the mold, supporting a sole plate for movement through the open bottom toward the lasted upper, adhesively attaching preformed intermediate bottom elements to the bottom of the lasted upper by moving the sole plate with the bottom elements resting thereon into engagement with the bottom of the lasted upper, retracting the sole plate, leaving the bottom elements attached to the bottom of the upper, sufficiently to provide a closed cavity between the bottom elements and the sole plate within which to form an outsole of suitable thickness, and injecting bottom-forming composition into the cavity to envelop the bottom elements and become attached to the bottom of the upper marginally of the elements.

6. The method of applying composite bottoms to shoes according to claim 4, which comprises applying an activatable adhesive to the elements and/or to the bottom of the upper.

7. A method according to claim 4, comprising applying an after-pressure to the sole plate following termination of injection to maintain the outsole under pressure while cooling.

8. A method according to claim 3, wherein the bottom elements comprise an insole and a heel core.

9. A method according to claim 3, wherein the bottom elements comprise a yieldable filler and a yieldable heel core.

10. A method according to claim 3, wherein the bottom elements are comprised of an insole and heel core, and wherein the insole and heel core are of smaller area than the corresponding portions of the bottom to which they are attached so that a substantial body of bottom-forming composition becomes attached to the bottom marginally of the bottom elements.

11. A method according to claim 3, wherein the sole plate is shaped to form an outsole and heel.

References Cited by the Examiner
UNITED STATES PATENTS 3,018,517　1/1962　Ludwig _____ 18—17
3,178,496　4/1965　Ferreira _____ 264—244

ROBERT F. WHITE, *Primary Examiner.*

T. J. CARVIS, *Assistant Examiner.*